United States Patent
Walters et al.

(10) Patent No.: US 8,636,261 B2
(45) Date of Patent: Jan. 28, 2014

(54) BRICK VENEER FORMLINER WITH POCKETS HAVING VARYING ANGLES AND VARYING DEPTHS

(75) Inventors: Marshall G. Walters, Lehighton, PA (US); Richard E. Fasching, Palmerton, PA (US)

(73) Assignee: Architectural Polymers, Inc., Palmerton, PA (US)

(*) Notice: Subject to any disclaimer, the term of this patent is extended or adjusted under 35 U.S.C. 154(b) by 668 days.

(21) Appl. No.: 12/717,172

(22) Filed: Mar. 4, 2010

(65) Prior Publication Data

US 2010/0155569 A1 Jun. 24, 2010

Related U.S. Application Data

(63) Continuation-in-part of application No. 12/253,809, filed on Oct. 17, 2008, now Pat. No. 8,181,930, and a continuation-in-part of application No. 11/099,347, filed on Apr. 5, 2005, now Pat. No. 7,871,054.

(60) Provisional application No. 60/650,934, filed on Feb. 8, 2005, provisional application No. 60/981,151, filed on Oct. 19, 2007.

(51) Int. Cl.
 E04G 11/20 (2006.01)
(52) U.S. Cl.
 CPC .................................... *E04G 11/20* (2013.01)
 USPC ............................................................ 249/15
(58) Field of Classification Search
 USPC .......................................... 249/15, 16, 83, 96
 See application file for complete search history.

(56) References Cited

U.S. PATENT DOCUMENTS

| | | | |
|---|---|---|---|
| 448,856 A | 3/1891 | Graff |
| 953,720 A | 4/1910 | Stoeser |
| 1,809,504 A | 6/1931 | Carvel |
| 3,055,148 A | 9/1962 | Christy |
| 3,602,476 A | 8/1971 | Iragorri |
| 3,705,830 A | 12/1972 | Gurgui et al. |
| 3,887,415 A | 6/1975 | Elmendorf et al. |
| 3,899,155 A | 8/1975 | Ward |
| 4,135,840 A | 1/1979 | Puccini et al. |
| 4,239,824 A | 12/1980 | Kasten |
| 4,407,480 A | 10/1983 | Trimmer et al. |
| 4,453,359 A | 6/1984 | Robinson |
| 4,548,008 A | 10/1985 | Maeda |
| 5,009,387 A | 4/1991 | Scott et al. |
| 5,268,137 A | 12/1993 | Scott et al. |
| D354,576 S | 1/1995 | Weinig |

(Continued)

OTHER PUBLICATIONS

"Forming the Future," Fitzgerald Formliners, Santa Ana, California (http://www.formliners.com/FormlinerTypes/Brickmaster/Index.htm, as accessed on May 30, 2006).

(Continued)

*Primary Examiner* — Michael Safavi
(74) *Attorney, Agent, or Firm* — McNees Wallace & Nurick LLC

(57) ABSTRACT

A formliner is disclosed. The formliner includes a plurality of courses, each course having a plurality of pockets, each pocket sized and configured to receive a decorative brick. The formliner is modular in nature and includes a joining portion for overlapping or being overlapped by a second formliner. At least one ridge of the formliner is at least partially within the joining portion.

14 Claims, 11 Drawing Sheets

(56) References Cited

U.S. PATENT DOCUMENTS

| | | | |
|---|---|---|---|
| 5,386,963 A * | 2/1995 | Nasvik et al. | 249/16 |
| 5,487,526 A | 1/1996 | Hupp | |
| 5,536,557 A * | 7/1996 | Nasvik et al. | 428/141 |
| 5,632,922 A * | 5/1997 | Nasvik et al. | 249/16 |
| D380,139 S | 6/1997 | Scott et al. | |
| 5,667,190 A | 9/1997 | Scott et al. | |
| 6,041,567 A | 3/2000 | Passeno | |
| 6,129,329 A * | 10/2000 | Nasvik et al. | 249/16 |
| 6,164,037 A | 12/2000 | Passeno | |
| 6,186,469 B1 | 2/2001 | Scott | |
| D448,856 S | 10/2001 | Boone | |
| 6,408,585 B1 | 6/2002 | Tajima | |
| D479,614 S | 9/2003 | Scott et al. | |
| 6,634,617 B2 | 10/2003 | Potvin | |
| 6,808,667 B2 * | 10/2004 | Nasvik et al. | 249/16 |
| 6,857,248 B2 * | 2/2005 | Ouellet et al. | 52/745.06 |
| 2006/0091282 A1 * | 5/2006 | Walters | 249/16 |

OTHER PUBLICATIONS

"Brick Gasket Liner," Scott System, Denver, Colorado (http://www.scottsystem.com/brickgaskets.htm, as accessed on May 30. 2006).

"Product Data FITZIT-M Liner," Universal brick systems, inc., Charlotte, Michigan, dated Jun., 2003 (http://www.bricksystems.com/fitmfeat.php, as accessed on May 30, 2006).

Fitzgerald Formliners Technical drawings dated May 22, 2001 and May 24, 2001 (4 pages).

\* cited by examiner

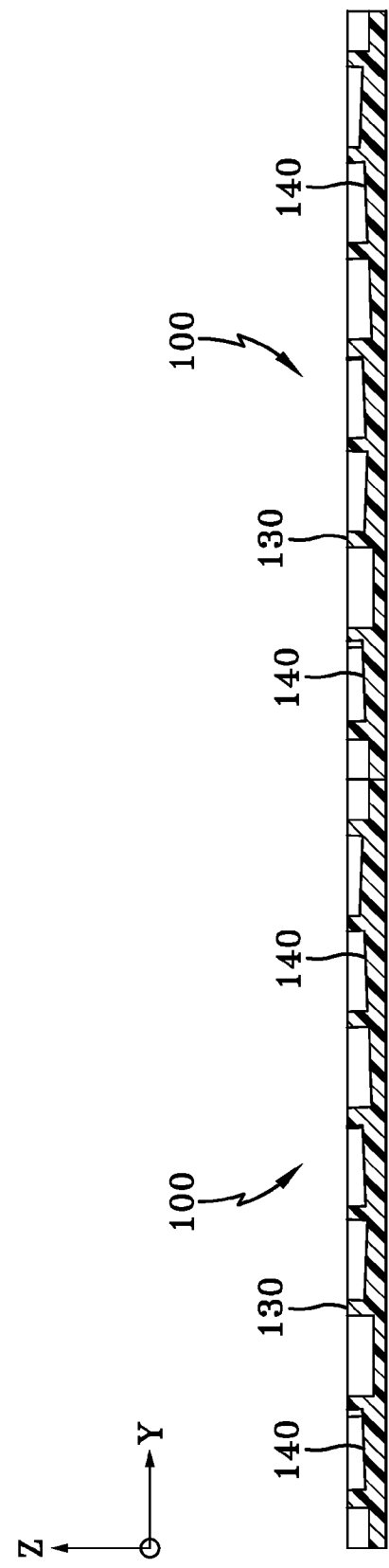

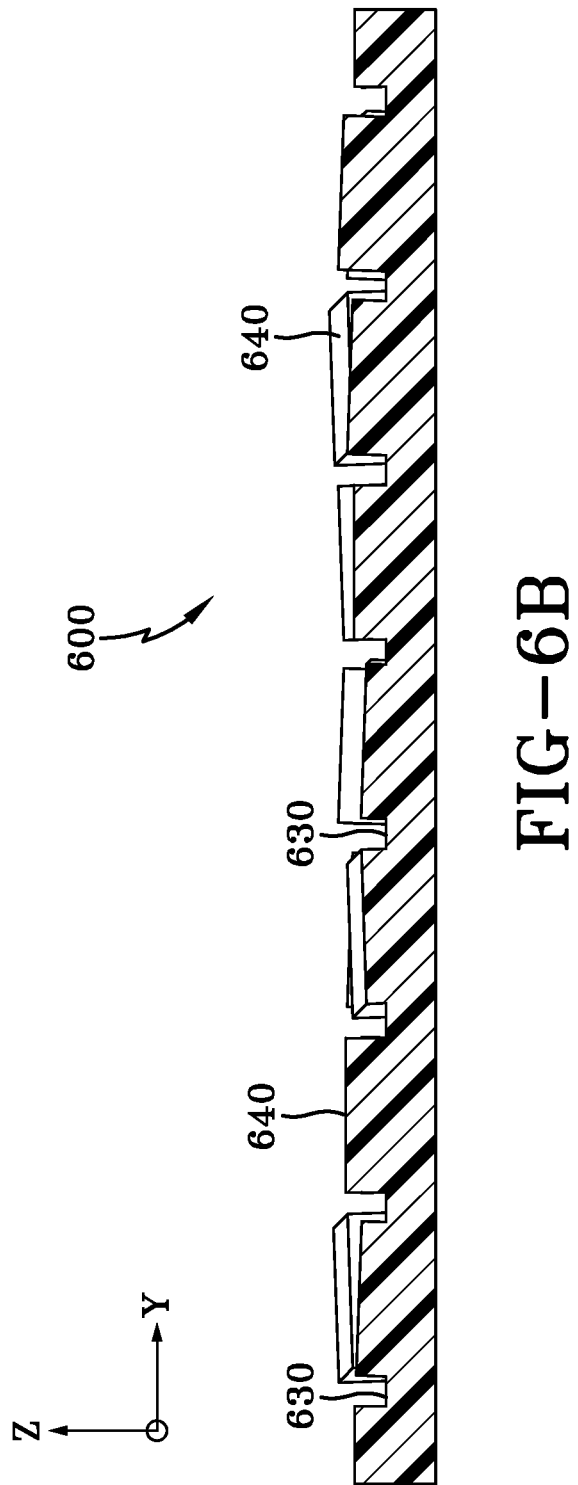

BRICK VENEER FORMLINER WITH POCKETS HAVING VARYING ANGLES AND VARYING DEPTHS

CROSS-REFERENCE TO RELATED APPLICATIONS

This application claims priority to and the benefit of U.S. patent application Ser. No. 12/253,809, entitled Variable Angle Formliner, filed Oct. 17, 2008, which claims priority to U.S. Provisional Patent Application No. 60/981,151, filed Oct. 19, 2007, and U.S. patent application Ser. No. 11/099,347, entitled Formliner Apparatus, filed Apr. 5, 2005, which claims priority to U.S. Provisional Patent Application No. 60/650,934, filed Feb. 8, 2005, all of which are hereby incorporated by reference in their entirety.

FIELD OF THE DISCLOSURE

The present disclosure relates generally to formliners. Specifically, the present disclosure relates to modular formliners with varying angles.

BACKGROUND OF THE DISCLOSURE

Architectural designs for various types of construction, including buildings and bridges, call for the use of brick in the construction of walls. Although ordinarily of little structural importance in modern construction projects, brick walls continue to be used for decorative architectural purposes. However, making walls entirely of brick and mortar has become relatively expensive in recent years in comparison to poured concrete. One development that has reduced the cost of brick walls has been the use of decorative thin bricks, which are cast into concrete wall panels. Such decorative bricks are significantly thinner than normal bricks and therefore are significantly less expensive than normal bricks per square foot of wall coverage.

Making decorative bricks into a regular brick wall can be difficult or impossible. In order to cast the decorative bricks into the concrete walls, polymer brick formliners were developed, which have a plurality of brick-receiving recesses. The brick-receiving recesses are designed to hold the decorative bricks in place during the casting of concrete walls. The brick-receiving recesses are formed into the formliners in regular brick patterns, with each recess having the same depth, so as to create a clean and organized brick appearance in the final panel product. Such formliners are first placed on a surface capable of supporting the weight of the formliners, decorative bricks, and poured concrete. Decorative bricks are then placed into the formliners and concrete is cast on top of the decorative bricks and formliners. After curing, the formliner is removed, revealing the wall having decorative bricks separated by cement mortar joints, ready for use in construction.

Unfortunately, the clean and organized appearance of the final brick-lined concrete panel has resulted in an unforeseen aesthetic problem. The use of such formliners in the manufacture of buildings has resulted in a very consistent appearance in such prefabricated wall sections. One purpose that drove the development of brick formliners was the creation of a wall that had the appearance of hand-laid brick, without the extra cost associated with it. However, the regularity and precision of the thin brick placement, which is the result of the use of current brick formliners, has resulted in the mass production of brick lined concrete panels that appear as though they have been manufactured by a machine rather than built up by hand.

Furthermore, previous master molds for producing polymer formliners were made from a very dense material, such as aluminum or steel. While this makes it easy to remove the formliner from the master mold during formliner manufacturing, it results in a very unnatural glass smooth joint when the form liners are used in combination with brick and cementitious material to produce wall sections.

What is needed is a new type of formliner that can be used to manufacture a brick wall which has the appearance that it was built by hand, rather than manufactured with a brick formliner.

SUMMARY OF THE DISCLOSURE

According to an exemplary embodiment of the disclosure, a formliner includes a plurality of courses, each course having a plurality of pockets, each pocket sized and configured to receive a decorative brick, a plurality of lateral and transverse ridges arranged and disposed to separate the pockets, and a joining portion arranged and disposed to join the formliner with a second formliner in an overlapping manner. At least one ridge of the plurality of ridges is at least partially within the joining portion, and the at least one ridge includes a varied width.

According to another exemplary embodiment of the disclosure, a formliner includes a plurality of courses, each course having a plurality of pockets, each pocket sized and configured to receive a decorative brick, a ridge lattice including at least one ridge having a dimension that differs from a same dimension of a second portion of the at least one ridge, and a joining portion arranged and disposed to join the modular formliner with a second formliner in an overlapping manner. The at least one ridge of the plurality of ridges is at least partially within the joining portion.

An advantage of an exemplary embodiment of the disclosure is that the angle of the pockets are varied, providing a brick veneer wall manufactured with the formliner of the present disclosure with the appearance of hand laid brick.

An advantage of another exemplary embodiment of the disclosure is that the depth of the pockets may also be varied, further providing a brick veneer wall manufactured with the formliner of the present disclosure with the appearance of hand laid brick.

An advantage of yet another exemplary embodiment of the disclosure is that the formliner contains a slightly rough texture, such that mortar joints formed by pouring cementitious material over the formliner provide a sandy, grout-like appearance.

Still another advantage of certain embodiments is that adjacent formliners can be overlapped in a modular manner despite the non-uniform arrangement resulting from the varying angles and ridge widths.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

FIG. 4B illustrates a sectional view of the plurality of formliners in FIG. 4A along line 4-4.

FIG. 6B illustrates a sectional view of the master mold in FIG. 6A along a line 6-6.

Wherever possible, the same reference numbers will be used throughout the drawings to represent the same parts.

DETAILED DESCRIPTION OF THE DISCLOSURE

Figure 4A:
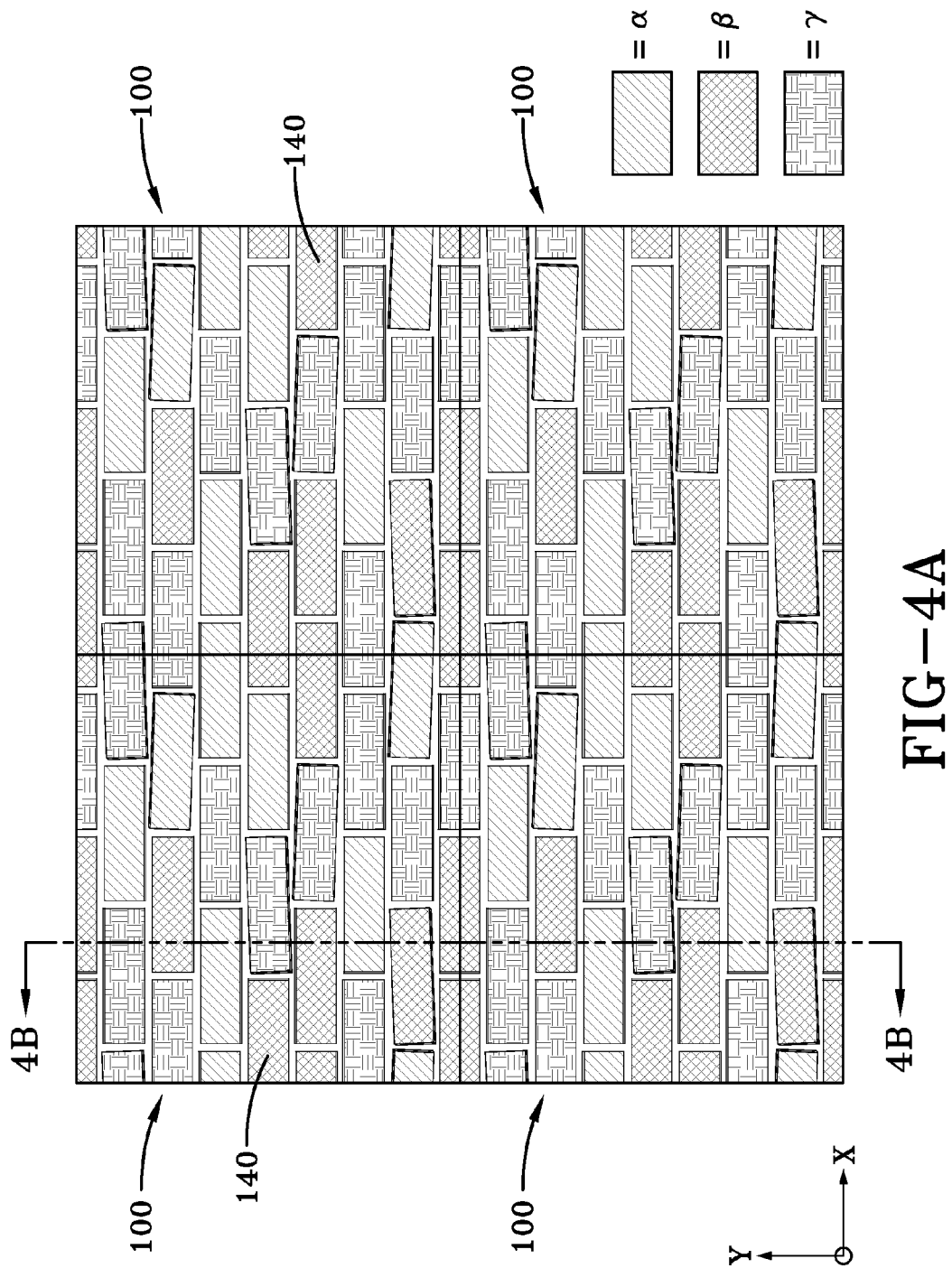
FIG. 4A illustrates a front view of a plurality of formliners according to another exemplary embodiment of the disclosure.
Figure 5A:
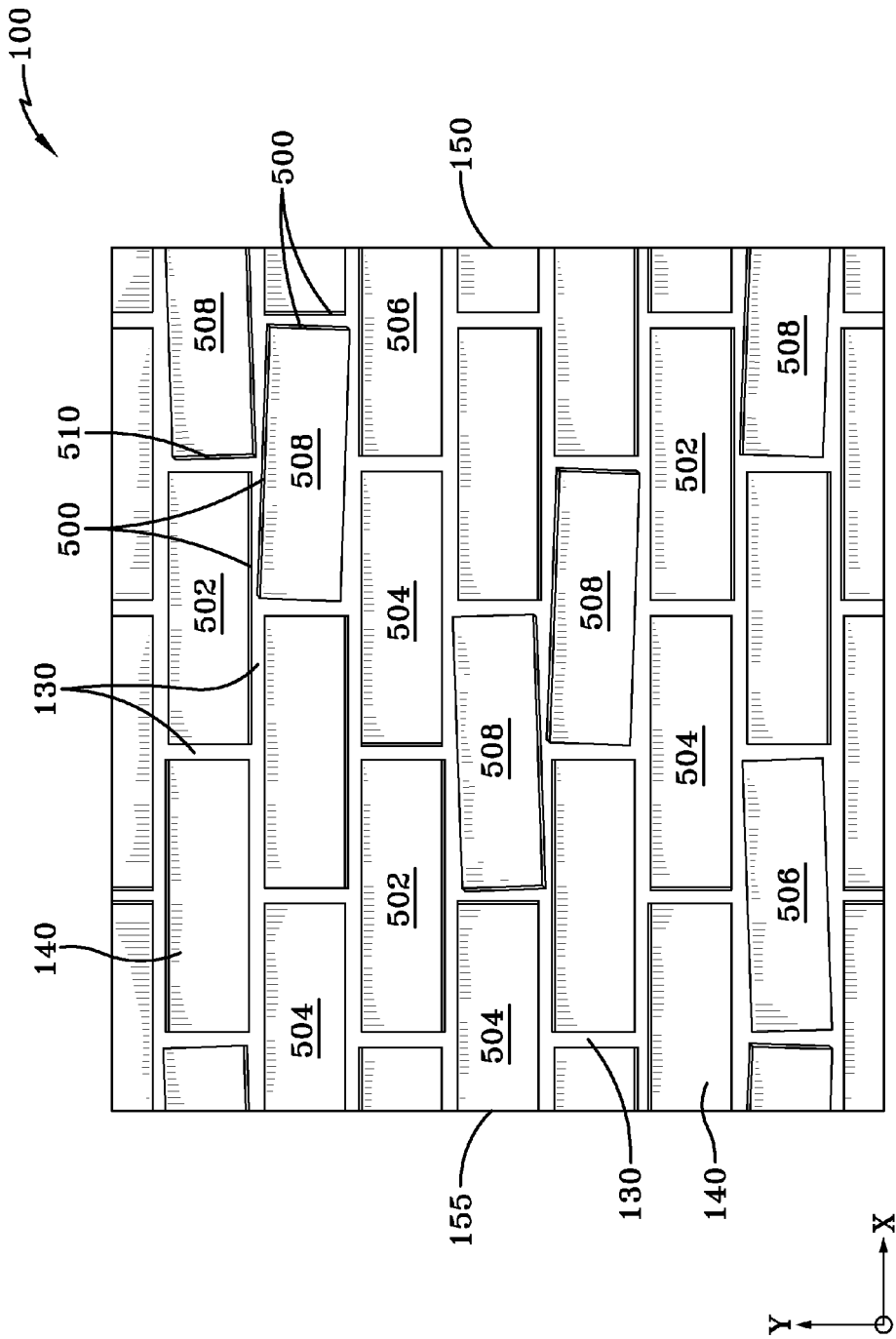
FIG. 5A illustrates a front view of a formliner with a plurality of variable angles.

FIGS. 1, 2, 3, 4A, 4B, 5A, 5B, 7 and 8 illustrate formliners. As will be appreciated, the illustrations are intended to provide an understanding of the principles of the formliner in accordance with exemplary embodiments of the disclosure and are not necessarily to scale. Similarly, FIGS. 6A and 6B illustrate a master mold and are intended to provide an understanding of the principles of the master mold and are not necessarily to scale.

The formliner 100 may be manufactured from any suitable material, for instance a resilient polymer of sufficient strength compatible with a cementitious material. Such a material may include, but not be limited to, a thermoplastic or elastomeric material, such as rubber. In one embodiment, formliner 100 is manufactured from a resilient elastomeric material so that the same formliner can be re-used. In another embodiment, formliner 100 is manufactured from an inexpensive, preferably recyclable, thermoplastic material for a single-use, permitting formliner 100 to be recycled or disposed.

Figure 1:
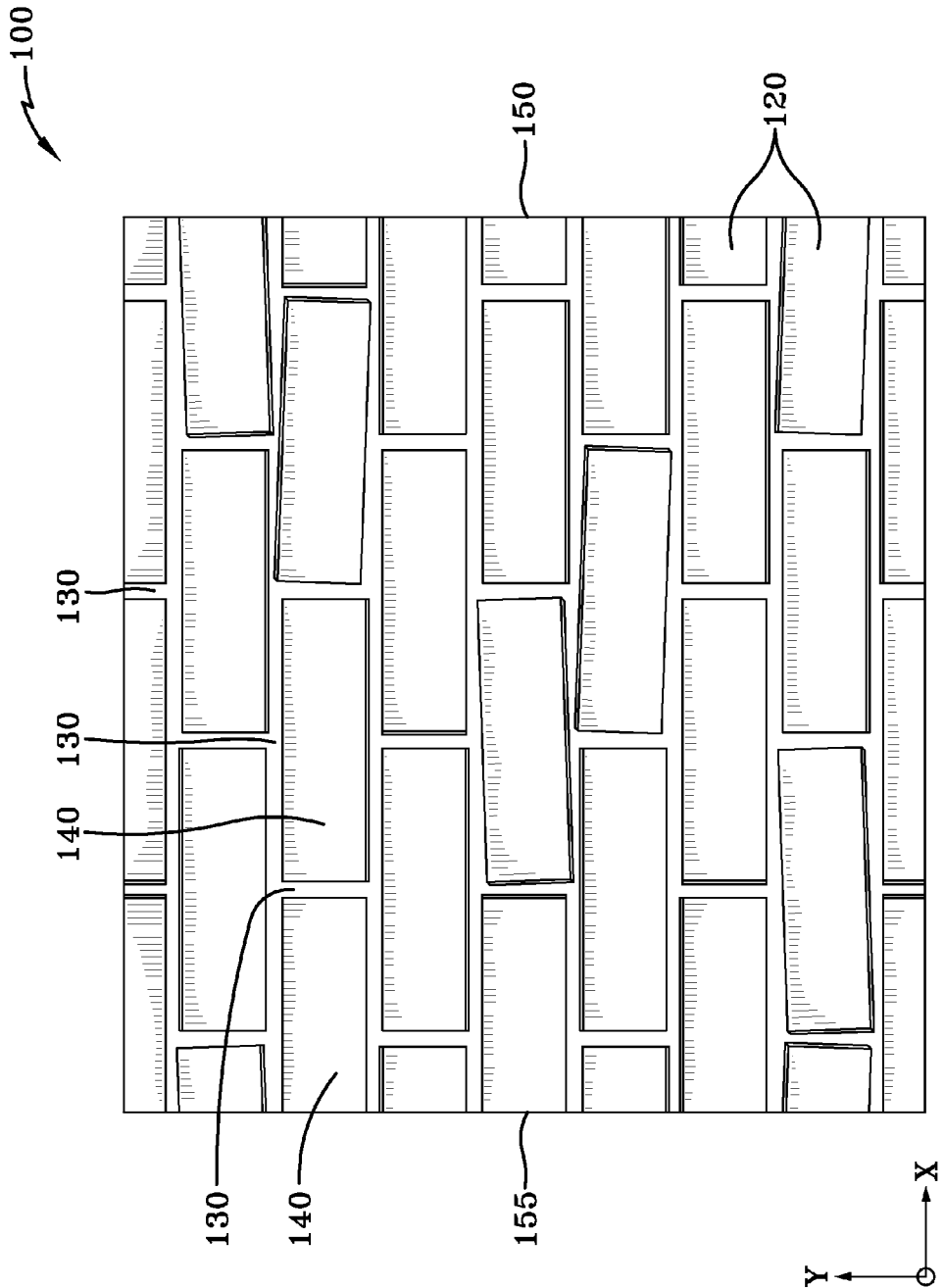
FIG. 1 illustrates a front view of a formliner in accordance with an exemplary embodiment of the disclosure.
Figure 7:
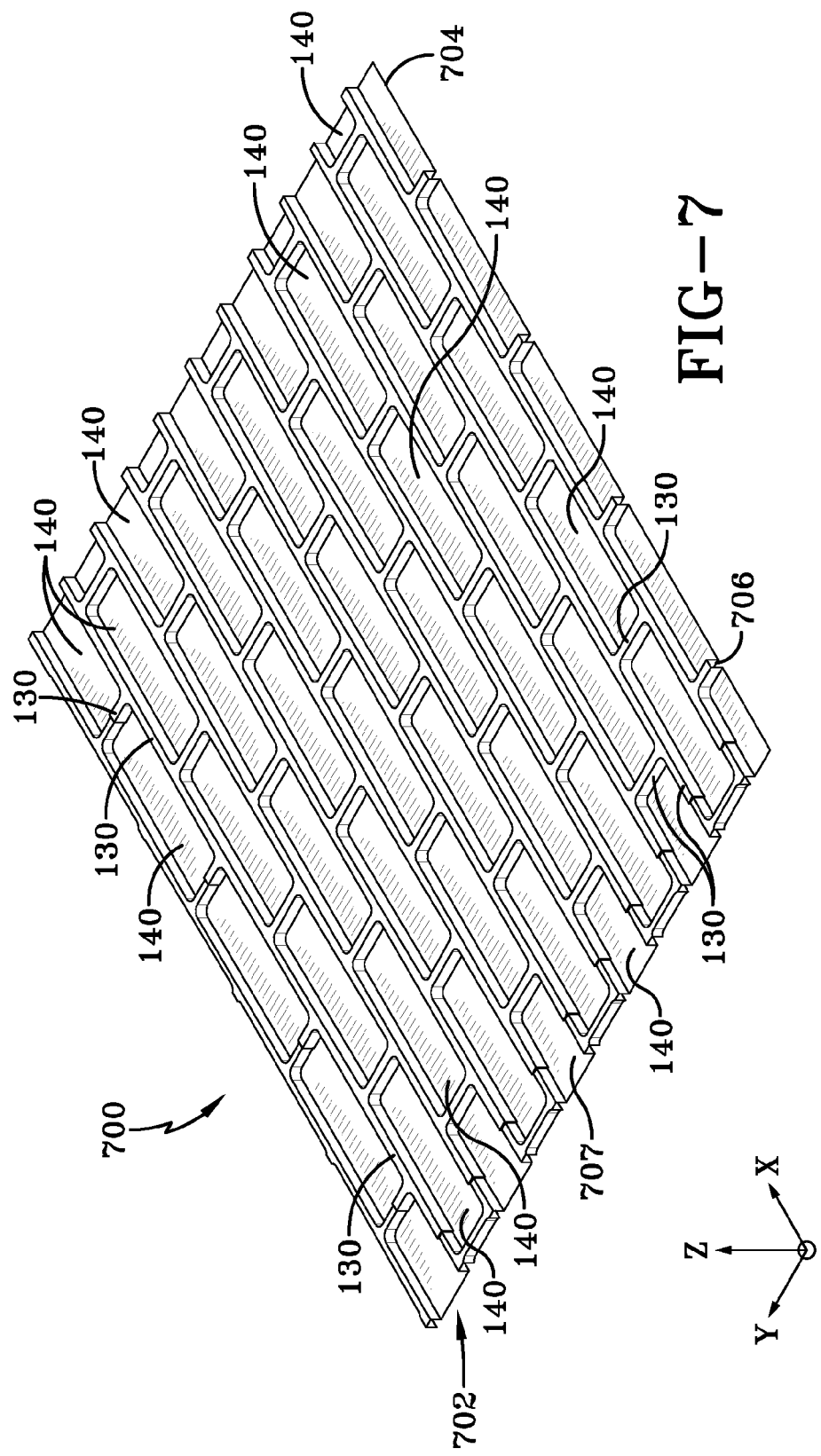
FIG. 7 illustrates a perspective view of an exemplary formliner.

Referring to FIG. 1, the formliner 100 has a plurality of courses 120, which may be rows as shown in the running bond pattern depicted in FIG. 1. Each course 120 has a plurality of recessed pockets 140 separated by ridges 130. Pockets 140 are sized and configured to receive decorative thin brick or similar veneer products, while ridges 130 are sized and configured to separate pockets 140, such that cementitious material applied over formliner 100 thereby gives the appearance of a mortar joint between the decorative thin bricks in a completed wall made using the formliner 100. In one embodiment, as shown in FIG. 7, at least one pocket 140 may have rounded corners to receive tumbled brick to further impart a distressed or aged appearance to a finished wall.

Referring again to FIG. 1, pockets 140 may be of any size and may be arranged in any pattern, but generally are sized to receive standard-size thin bricks and generally are arranged in any one of several traditional masonry patterns. Exemplary pocket sizes include pockets 140 sized to receive utility, Norman, modular and closure thin bricks, by way of example only. Exemplary masonry patterns include running bond, soldier course, Flemish bond, stack bond, ⅓ running bond, herringbone, basket weave, offset weave, and combinations thereof, by way of example only.

Formliners 100 may be modular in nature, with several formliners 100 smaller than the actual wall size to be formed positioned adjacent one another and/or overlapped. It will be appreciated that some pockets of each formliner may be associated with pre-determined sub-dimensions of brick. For example, as shown in FIG. 1, some of pockets 140 are sized to receive full size thin bricks, while others are half-size bricks to permit continuity of the brick pattern in the wall to be formed. Where multiple formliners 100 are positioned adjacent one another to form part of a wall larger than any single formliner 100 (see, e.g., FIGS. 3, 4A, 4B, 5, 5B, 8), a full size thin brick may be placed in adjacent half-pockets 140 in the same course 120 of adjacent formliners 100. Similarly, at the wall's edge, half-sized thin bricks may be placed in the half-pockets to give the appearance, for example, of the corner of a masonry wall.

Figure 5B:
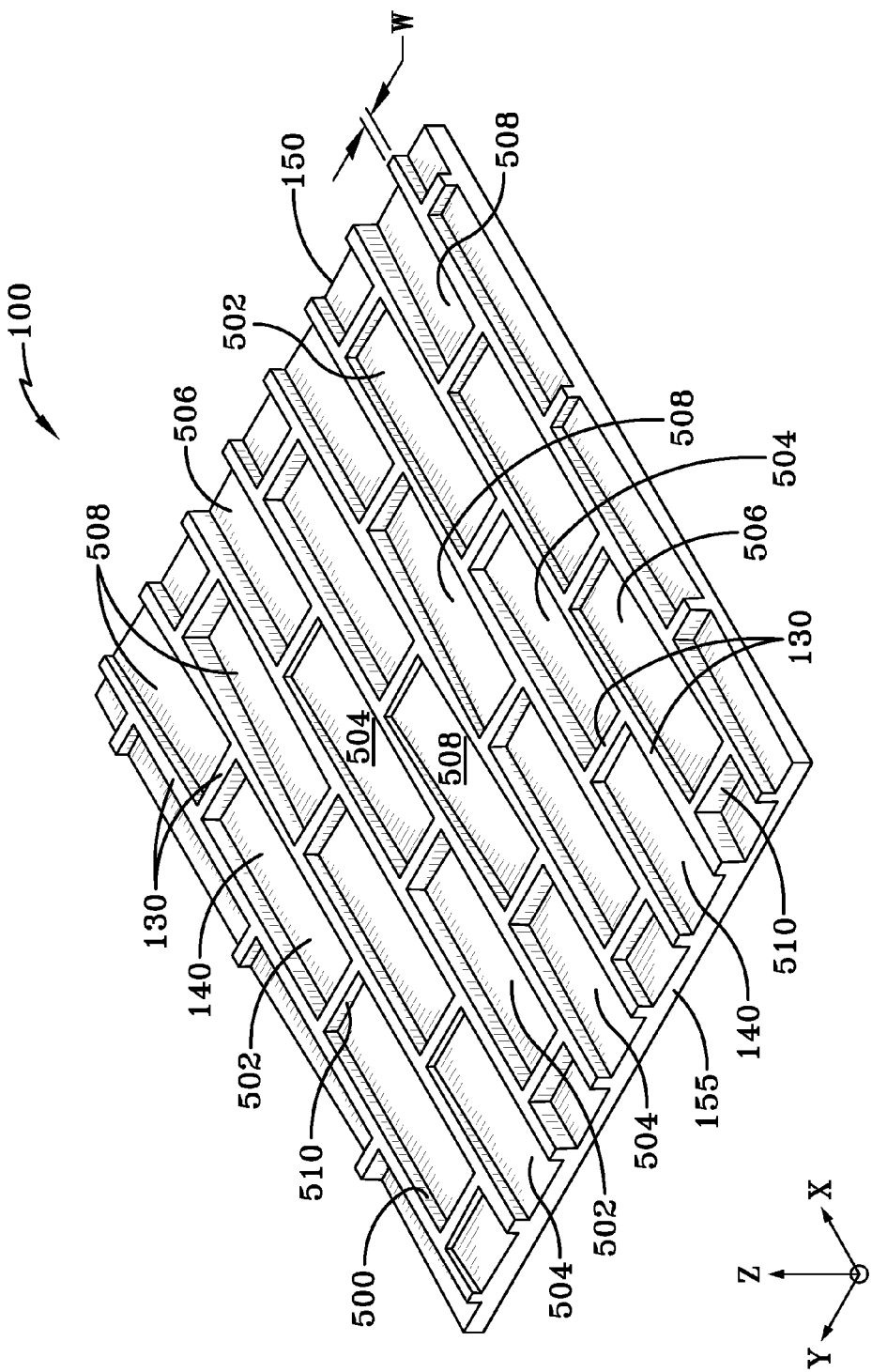
FIG. 5B illustrates a perspective view of the formliner in FIG. 5A.
Figure 6A:
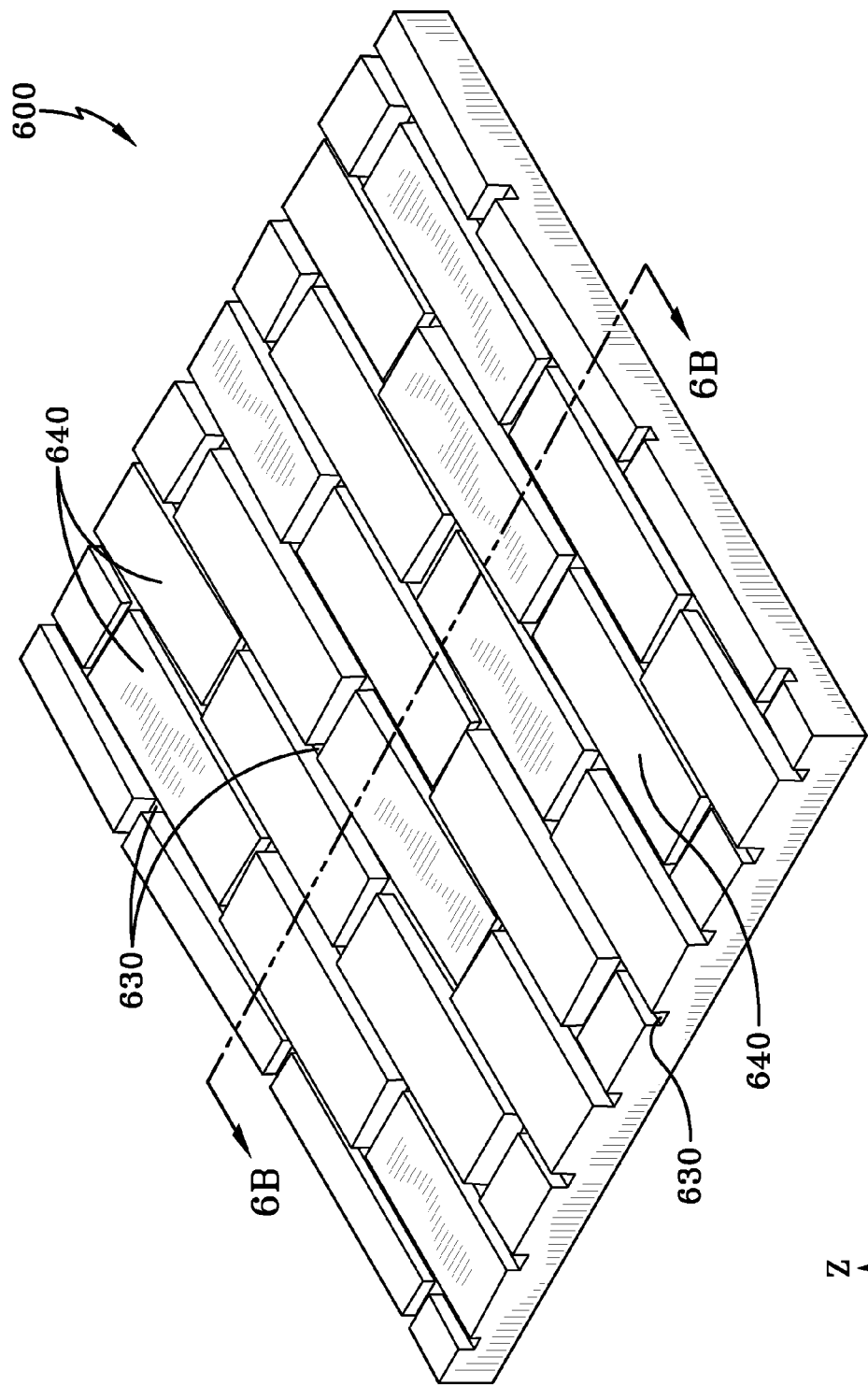
FIG. 6A illustrates a perspective view of a master mold according to an exemplary embodiment of the disclosure.

Referring to FIG. 5B, one or more of the ridges 130 may have a varied width (the width being measured as shown by width W in FIG. 5B). The varied width may extend along the ridge 130 through the entire course 120. In one embodiment, the varied width may extend along the ridge 130 through a portion of the course 120. For example, the varied width may extend along a portion of one pocket 140, one pocket 140, two pockets 140, or any other suitable distance.

Figure 3:
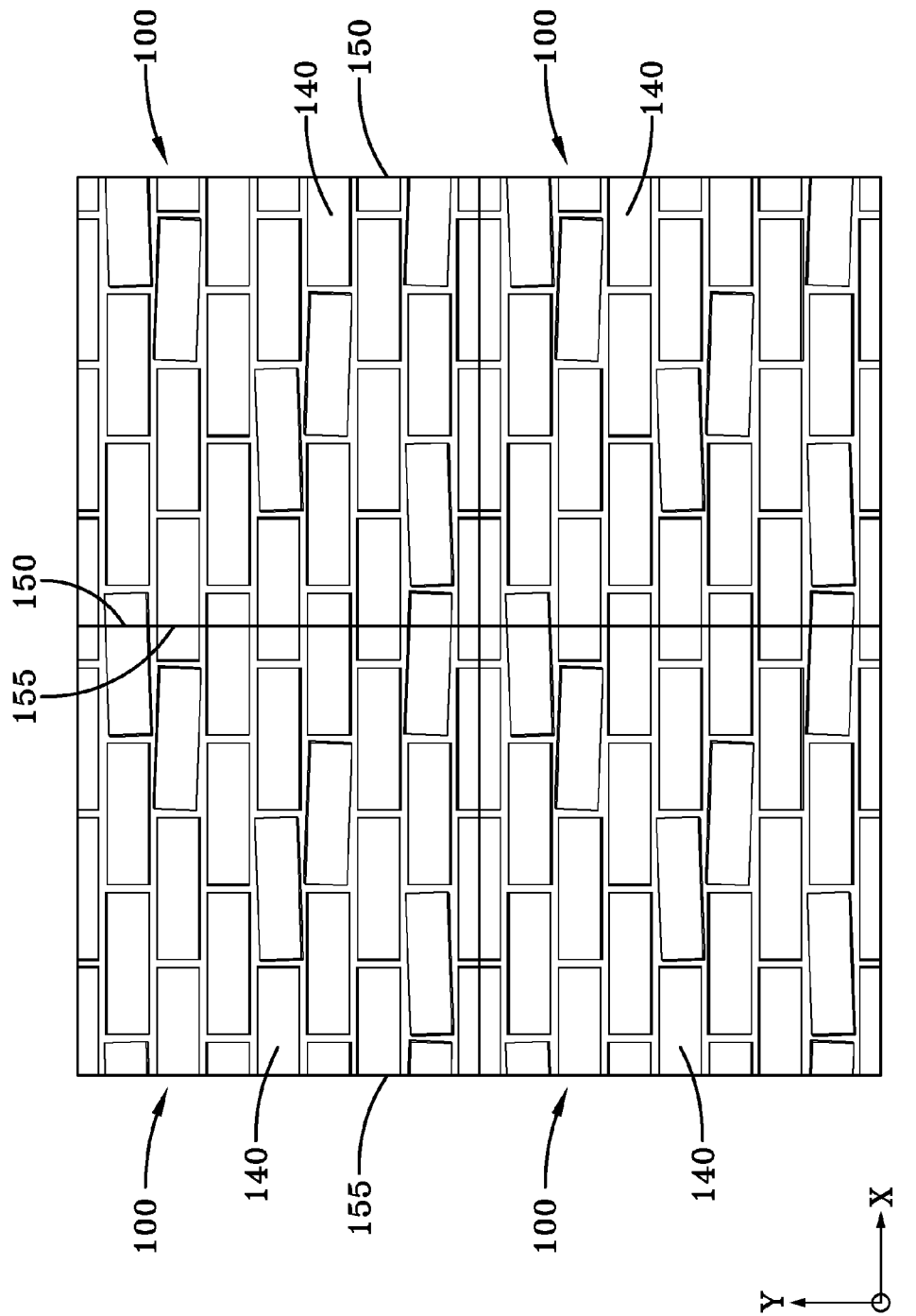
FIG. 3 illustrates a front view of a plurality of formliners according to an exemplary embodiment of the disclosure.

The formliner 100 may be of any desired dimensions to produce a wall of any size. Alternatively, multiple formliners 100 can be used together to form a wall larger than any single formliner 100 as previously described by aligning a first edge 150 of a first formliner 100 with a second edge 155 of a second formliner 100 in any suitable manner, as illustrated for example, in FIG. 3 showing four modular formliners 100 positioned adjacent one another. For modular applications, it will be appreciated that the dimensions of the formliner 100 may be adjusted depending on the pattern and brick size according to well-known masonry principles to avoid or reduce the amount of cutting or partial formliners needed for standard size masonry walls. For example, it may be advantageous to produce the formliner 100 having dimensions of 2 feet square, 4 feet square or 4 feet by 8 feet, which permit standard size walls to easily be prepared.

The ridges 130 are formed in a lattice that defines lateral walls between the courses 120 as well as longitudinal sides 510 between the pockets 140 within the same course 120 to separate the pockets 140 and in order to give the appearance of mortar joints in the completed wall made using formliner 100. The appearance of the ridges 130 may be modified by rotating the pockets 140. For example, the ridges 130 may be narrower or wider in various portions of formliner 100 when pockets 140 in the same portion of the formliner 100 are rotated (as best seen in FIGS. 5A and 5B).

This varying of ridges 130 may be desirable in creating an aesthetic appearance that the completed section of wall is hand laid because many hand laid walls rely upon a mortar joint having a non-uniform appearance, which may include coved or raked surfaces. Similarly, varying the surface of the ridges 130, for instance by varying the dimensions (i.e., height or width) or including an inconsistent texture, may result in the completed section of wall appearing to be hand laid.

Figure 2:
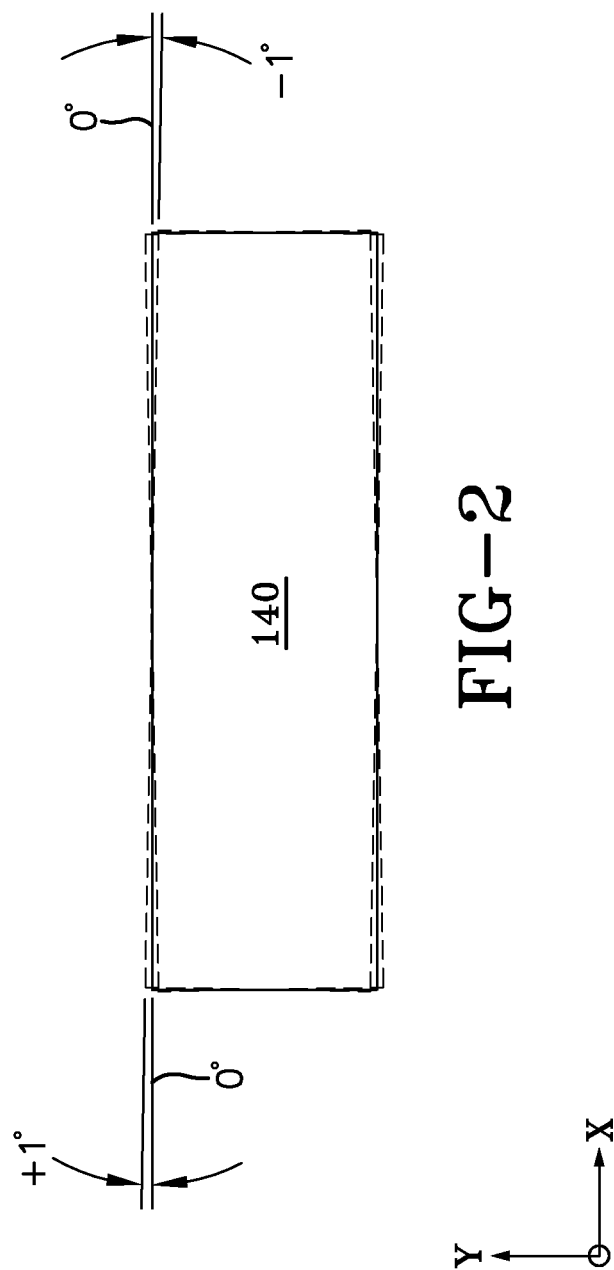
FIG. 2 illustrates a schematic illustration of a front view of a pocket rotated in an x-y plane.

As schematically illustrated in the front view of the pocket 140 in FIG. 2, each pocket 140 in each course 120 has an angle of rotation. For the purposes of this application, the phrase "angle of rotation" refers to the amount by which pocket 140 is rotated out of any one of an x-y plane, an x-z plane, and a y-z plane. The x-axis is a line parallel with any course 120; the y-axis is a line perpendicular to the x-axis; the z-axis is a line perpendicular to both the x-axis and the y-axis. Thus one or more of the pockets 140 may be rotated so that the bricks within each course and with respect to adjacent courses are not uniformly aligned when the finished wall section is viewed.

The angle of rotation for each pocket 140 may be from about −5.0° to about 5.0° in each of the three planes. Preferably, the angle of rotation is in the range of about −2.0° to about 2.0° and more preferably from about −1.0° to about 1.0°. The angle by which each pocket 140 is rotated may be random within the range. In one embodiment, pockets 140 are oriented at one of five different angles of rotation: −1.0°, −0.5°, 0°, 0.5° and 1.0°. The number of bricks at each angle within the formliner 100 may be varied randomly or according to a predetermined pattern, which may be selected, for example, because the pattern gives the appearance of being random or otherwise appears non-uniform in a manner that is aesthetically appealing. In an alternate embodiment, the distribution of the angles of rotation may be arranged in a predetermined pattern that does not appear non-uniform or random. In this alternate embodiment, varying angles may be used for additional aesthetic purposes, such as to create designs.

While some or all of the pockets 140 are rotated from level (i.e., have an angle of rotation other than 0°), each of the corners of the formliner 100 itself are preferably square to achieve a better modular fit when multiple formliners are positioned adjacent one another.

While FIG. 2 illustrates pocket 140 rotated within the x-y plane, it is to be understood that the rotation may be within the x-y plane, the x-z plane, the y-z plane, and/or any combination thereof.

FIGS. 5A and 5B illustrate formliner 100 with pockets 140 rotated within the x-y plane, the x-z plane, the y-z plane, and combinations thereof. Rotation of pockets 140 permits a side of pocket 140 to be partially seen in the front view of FIG. 5A. As illustrated in FIG. 5A, the side visible depends upon which direction pocket 140 is rotated. For pockets 140 that are rotated in multiple directions, multiple sides are visible from the front view of FIG. 5A. By way of example, pocket 502 is rotated within the y-z plane thereby permitting the lateral sides 500 of the pocket to be visible in FIG. 5A. By way of example, pocket 504 is rotated in the x-z plane thereby permitting the longitudinal sides 510 of the pocket to be visible. By way of example, pocket 506 is rotated in the x-y plane thereby orienting the pocket so that it is not parallel along course 120. By way of example, in formliner 100 illustrated in FIGS. 5A and 5B, pockets 508 are rotated in combinations of directions.

In some embodiments, such as those in which the formliner is constructed of a durable, elastomeric material, like formliners may be butted together in an adjacent manner as illustrated in FIG. 3. In other embodiments, the formliner may be constructed of a thermoplastic material for individual use, and consequently may be constructed of a thinner, less durable material in which adjacent formliners are positioned adjacent one another in an overlapping manner for increased support at the interface between formliners and to reduce leakage of cementitious material. In such cases, the presence of varying pocket angles and a corresponding variance in ridge width increases the complexity of how overlapping formliners can be joined.

Figure 8:
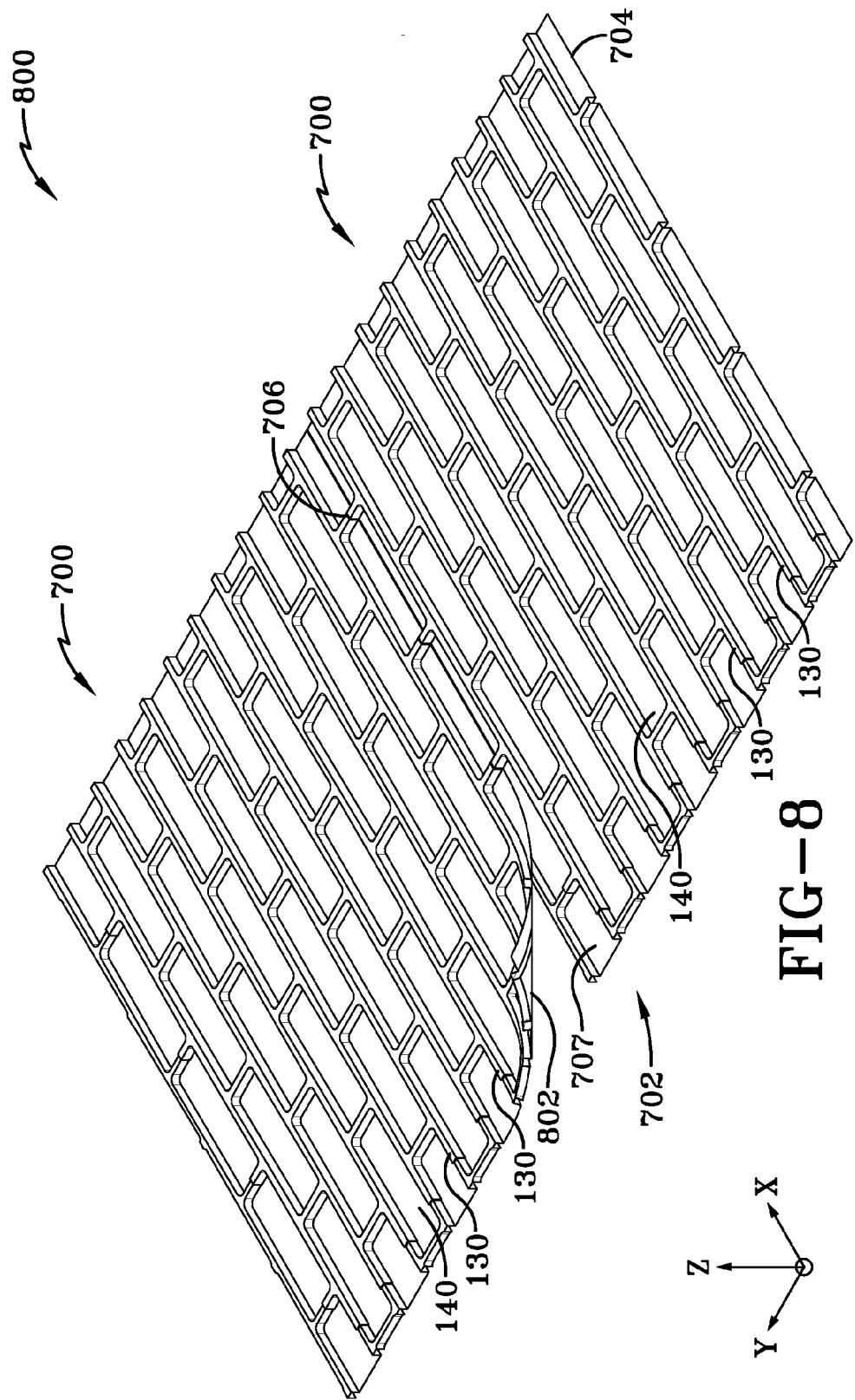
FIG. 8 illustrates a perspective view of an exemplary formliner overlapping an additional formliner to form a larger wall portion.

Referring to FIGS. 7 and 8, this complexity is addressed by providing a first formliner 700 that may be joined with a second formliner to form a larger wall portion 800 or complete wall by being joined along a joining portion 702 that may include alignment features. The alignment features may include overlapping features 706 and/or overlapped features 707. The overlapping features 706 are configured to align with the overlapped features 707 to form a substantially seamless larger wall portion 800. The overlapping features 706 may be positioned on a side opposite overlapped features 707. As shown in FIGS. 7 and 8, overlapping features 706 may be positioned on two sides and overlapped features 707 may be positioned on the remaining two sides.

Absent the joining portion 702 for formliners constructed to be assembled in an overlapping fashion, the varying widths of the ridges 130 along the joining portion 702 may result in difficulty in positioning multiple formliners 100 to form the completed wall. Including the alignment features permits repeatable positioning of multiple formliners 100 having varying widths of the ridges 130. Thus, joining portion 702 may permit the desired aesthetic features of varying widths to be present between multiple formliners 700. As a result, modular formliners having squared corners can still be easily formed in a repetitious manner even though the wall segment formed by any one formliner may not itself be entirely square as a result of the varying dimensions of the ridges 130 and pocket angles.

The modular formliner 700 may be joined to a formliner similar to formliner 700 (as shown in FIG. 8), and/or any other suitable formliner. The formliner 700 may include alignment features for overlapping (or being overlapped by) the second formliner. The alignment features may be within one or more of the ridges 130 of the first modular formliner 700. In one embodiment, the alignment features may provide additional stability and further consolidation for a plurality of modular formliners 700 to be stacked for transport.

In one embodiment, the alignment features are within the ridge 130 extending along the joining portion 702. In the embodiment, the ridge 130 of the modular formliner 700 overlaps (or is overlapped by) a similar ridge of the second formliner to form a portion of a wall or a completed wall. Additionally or alternatively, the alignment features may be part of any other suitable feature of the formliner 700.

In one embodiment, the joining portion 702 may correspond to a partial pocket 704 for a pre-determined sub-dimension of a brick. In another embodiment, as shown in FIG. 8, the joining portion 702 may correspond to the pocket 140, the ridge 130, and the partial pocket 704. The partial pocket 704 may be configured to receive a portion of a brick. Including the partial pocket 704 and/or pocket 140 in the joining portion 702 may prevent cementitious material from seeping through a seam that may be created if two thin, thermoplastic formliners were aligned without overlapping. Also, the predetermined sub-dimension of the brick may prevent the formation of a visible seam in the portion of the wall or the completed wall.

The formliner 700 may include a plurality of portions capable of being joined. For example, the formliner 700 of FIG. 7 may be joined to a formliner identical to the formliner 700 to extend the overlapping formliners in the Y direction to form the larger wall portion 800 (in addition to the position for stacking modular formliners 700). As seen in FIG. 8, one formliner 700 includes an overlapping portion 802 covered by the joining portion 702 of the other modular formliner 700. Similarly, the formliner 700 of FIG. 7 may be joined to a formliner identical to the formliner 700 to extend the formed portion 800 in the X direction. As will be appreciated, multiple modular formliners 700 may be overlapped in varying configurations to achieve the desired size for the larger wall portion 800.

According to another embodiment of the disclosure, the depth of the pocket may also be varied, as described, for example, in U.S. Publication 2006/0091282, which is hereby incorporated by reference in its entirety. This varying depth may be combined with the varying angles according to the exemplary embodiments of the present disclosure.

Referring to FIGS. 4A and 4B, the varying depths combined with varying angles of rotation may be utilized to further enhance the realistic appearance of a wall produced by formliner 100. As illustrated, each pocket 140 has a bottom surface that is a plane at one of three different depths, α, β, γ, in which the different depths are illustrated with different cross-hatchings. The α pockets have a first predetermined depth, as measured from any suitable plane of reference. In one embodiment, the reference plane is the plane encompassing the highest point of ridges 130 (i.e., the apex of the ridge for a coved joint or the top plane of the ridge for a raked joint). The β pocket has a second predetermined depth, which in the illustrated embodiment is 3/16 in. less than the α pockets. Similarly, in the illustrated embodiment, the γ pockets have a third predetermined depth 3/8 in. less than the α pockets (and, thus, 3/16 in. less than the β pockets).

Where multiple pocket depths are employed, the number of different pocket depths may be as few as two and as great as the number of pockets 140 in formliner 100. In embodiments in which the pocket depths are varied, the difference in pocket depths may vary from about 0.01 in. to about 0.25 in., and more typically may vary from about 1/16 in. to about 3/8 in. Like the distribution of the angles of rotation, the distribution of pocket depths within formliner 100 may be substantially random. In other embodiments, the distribution of pocket depths may be arranged in a predetermined pattern, which may be selected, for example, because it gives the appearance of being random or otherwise gives the appearance of being non-uniform in a manner that is aesthetically appealing. It will be appreciated that pockets may be random within a formliner but identical to pockets in an identical formliner. In an alternate embodiment, the distribution of pocket depths may be arranged in a predetermined pattern that does not appear non-uniform or random. In this alternate embodiment, varying depths may be used for aesthetic purposes, such as to create designs.

FIGS. 6A and 6B illustrate a master mold 600, according to one exemplary embodiment of the disclosure, for producing formliners 100. Master mold 600 may be used independently or in conjunction with other master molds to produce a larger formliner.

The manufacturing process to produce formliners 100 generally involves production from master mold 600. The material for formliner 100 is injected or poured into master mold 600 and is formed using well-known injection molding, thermoforming, or rubber casting techniques. Master mold 600 may be aluminum, steel or other high density material. Each master mold 600 includes pocket molds 640 that produce pockets 140 and a lattice of ridge molds 630 that produces ridges 130 in the formliner. As will be appreciated by those skilled in the art, producing varying angle or depth pockets 140 in a formliner may be achieved by using pocket molds 640 with corresponding varying angles or heights and ridge molds 630 with varying angles or depths.

In a preferred embodiment, master mold 600 is a rigid foam, such as a rigid high-density urethane closed cell foam or a rigid polyisocyanurate foam. A master mold 600 formed from such rigid foams produces a textured formliner 100 having textured ridges 130 that results in a more realistic mortar joint that is sandy and grout-like in feel and appearance. The results can be achieved with ridges 130 that provide a mortar joint having either a coved (rounded) or raked (flat) profile. Generally, liquid molding compounds used in manufacturing elastomeric liners are difficult to remove from porous master molds, as the compound may seep into the pores and bond with the master mold. As a result, demolding can destroy the master mold and damage the formliner beyond reasonable repair. The rigid urethane and polyisocyanurate closed cell foams are unexpectedly able to resist destruction during the demolding process, while repeatedly providing a formliner capable of achieving the desired realistic result.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A formliner, comprising:
a plurality of courses, each course having a plurality of pockets, each pocket sized and configured to receive a decorative brick;
a plurality of lateral and transverse ridges arranged and disposed to separate the pockets; and
a joining portion arranged and disposed to join the formliner with a second formliner in an overlapping manner;
wherein at least one ridge of the plurality of ridges is at least partially within the joining portion,
wherein the at least one ridge includes a varied width; and
wherein the joining portion includes a partial pocket, the partial pocket extending from the at least one ridge within the joining portion and being configured to receive a portion of a decorative brick.

2. The formliner of claim 1, wherein the at least one ridge including a varied width extends along the joining portion.

3. The formliner of claim 1, wherein at least one lateral ridge extends from a first transverse ridge to a second transverse ridge.

4. The formliner of claim 1, wherein the joining portion includes an alignment feature for overlapping a ridge of the second formliner.

5. The formliner of claim 1, wherein the formliner comprises a thermoplastic material.

6. The formliner of claim 1, wherein a plurality of ridges are textured.

7. The formliner of claim 1, wherein at least one pocket of the plurality of pockets is sized and configured to receive tumbled brick.

8. A formliner, comprising:
a plurality of courses, each course having a plurality of pockets, each pocket sized and configured to receive a decorative brick;
a ridge lattice including at least one ridge having a dimension that differs from a same dimension of a second portion of the at least one ridge; and
a joining portion arranged and disposed to join the formliner with a second formliner in an overlapping manner,
wherein the at least one ridge of the plurality of ridges is at least partially within the joining portion; and
wherein the dimension that differs is a ridge height.

9. The formliner of claim 8, wherein the dimension that differs is a ridge width.

10. The formliner of claim 8, wherein the at least one ridge extends along the joining portion.

11. The formliner of claim 8, wherein the at least one ridge partially within the joining portion extends laterally from a first ridge to a second ridge.

12. The formliner of claim 8, wherein the joining portion includes an alignment feature for overlapping a ridge of the second formliner.

13. The formliner of claim 8, wherein the at least one ridge is textured.

14. The formliner of claim 8, wherein at least one pocket of the plurality of pockets is sized and configured to receive tumbled brick.

* * * * *